(12) United States Patent
Tatsumi et al.

(10) Patent No.: US 6,573,352 B1
(45) Date of Patent: Jun. 3, 2003

(54) OLEFINIC POLYMER

(75) Inventors: Tomio Tatsumi, Ichihara (JP); Shuji Machida, Ichihara (JP); Mitsugu Kanzawa, Ichihara (JP); Yutaka Minami, Ichihara (JP); Yasuhiro Goto, Ichihara (JP); Masato Kijima, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/424,985

(22) PCT Filed: Jun. 4, 1998

(86) PCT No.: PCT/JP98/02480

§ 371 (c)(1),
(2), (4) Date: Dec. 3, 1999

(87) PCT Pub. No.: WO98/55520

PCT Pub. Date: Dec. 10, 1998

(30) Foreign Application Priority Data

| Jun. 6, 1997 | (JP) | ................................. 9-149420 |
| Jun. 6, 1997 | (JP) | ................................. 9-149421 |
| Jan. 12, 1998 | (JP) | ............................... 10-003856 |
| Apr. 8, 1998 | (JP) | ............................... 10-095947 |

(51) Int. Cl.[7] ............................................. C08F 110/06
(52) U.S. Cl. ................. 526/351; 526/348.2; 526/348.5; 526/348.6; 526/348.3; 526/348.4
(58) Field of Search ........................ 526/351, 348.2, 526/348.5, 348.6, 348.3, 348.4

(56) References Cited

U.S. PATENT DOCUMENTS

| 4,028,481 A | * | 6/1977 | Shiomura et al. | ............ 526/142 |
| 4,499,247 A | * | 2/1985 | Chiba et al. | ................ 526/142 |
| 4,916,198 A | | 4/1990 | Scheve et al. | |
| 5,317,036 A | * | 5/1994 | Brady et al. | ................ 523/223 |
| 5,859,159 A | | 1/1999 | Rossi et al. | |
| 6,147,180 A | * | 11/2000 | Markel et al. | ............... 526/352 |
| 6,177,527 B1 | * | 1/2001 | Sishta et al. | ................ 526/134 |
| 6,184,327 B1 | * | 2/2001 | Weng et al. | ................ 526/351 |
| 6,197,910 B1 | * | 3/2001 | Weng et al. | ................ 526/351 |

FOREIGN PATENT DOCUMENTS

| EP | 0 802 206 A2 | 10/1997 |
| EP | 2000038418 | 7/1998 |
| JP | 2000-038418 | 2/2000 |
| WO | WO 96/34024 | * 10/1996 |
| WO | WO 99 29742 A | 6/1999 |

* cited by examiner

*Primary Examiner*—David W. Wu
*Assistant Examiner*—William Cheung
(74) *Attorney, Agent, or Firm*—Oblon, Spivak, McClelland, Maier & Neustadt, P.C.

(57) ABSTRACT

Long-chain, branched, propylene-based polymers, of which the melt index and the molecular weight distribution and the melt tension and the limiting viscosity both satisfy specific requirements, have good physical properties that are comparable to or better than those of conventional propylene-based polymers. They have good melt workability and are favorable to large-size blow molding and extrusion foaming. They are favorably used as miscibility improvers for propylene homopolymers and propylene-based copolymers.

17 Claims, No Drawings

US 6,573,352 B1

OLEFINIC POLYMER

FIELD OF THE INVENTION

The present invention relates to a propylene-based polymer, especially to a branched propylene-based polymer. More precisely, it relates to a propylene-based polymer, of which the properties are comparable to or better than those of conventional propylene-based polymers, and which has good melt workability and is favorably used for large-size blow molding, extrusion foaming and the like.

In addition, the invention also relates to a propylene-based polymer which, in a composite material comprising the propylene-based polymer and some other propylene-based block copolymer and/or random copolymer, functions as a miscibility improver for those polyolefin-based resins and is effective for improving the properties of the composite material and for elastomerizing it.

BACKGROUND OF THE INVENTION

Polypropylene has heretofore been widely used in various fields, as being characterized in that (1) it has high mechanical strength such as stiffness, and has good physical balance, (2) it is chemically stable, while having good weather resistance, and is hardly corroded by chemicals, (3) it has a high melting point and has good heat resistance, and (4) it is lightweight and low-priced. In addition, as having good melt workability, various melt molding methods of, for example, extrusion molding, blow molding, injection molding and inflation molding are applicable to polypropylene.

To produce thermoplastic resin foams, amorphous resins such as polystyrene have heretofore been much used, as being relatively easily subjected to extrusion foaming. In these days, however, there is increasing a great demand for high-quality lightweight foams with good heat-insulating ability and good damping ability, especially those having good heat resistance and good impact resistance, for which polypropylene-based resin foams are being required.

However, polypropylene is problematic in that the suitable temperature range for its foaming is extremely narrow, since it has a relatively high degree of crystallization and its visco-elasticity greatly is greatly varied by minor temperature variation. Another problem is that bubbles in polypropylene foams could not be kept well therein but are easily broken, since the melt viscosity of polypropylene is extremely low at temperatures higher than its crystal melting point and the melt tension thereof is low. For these reasons, therefore, it is difficult to obtain polypropylene foams having closed cells therein and having good mechanical properties and heat resistance. In order to produce polypropylene-based resin foams through extrusion foaming, like polystyrene-based resin foams, propylene-based resin must be so modified that it is foamable within a broadened temperature range and that its melt has a high visco-elasticity at temperatures higher than its melting point.

As having excellent characteristics such as those mentioned above, polypropylene-based resin is actively used in car parts, etc., and it is much desired to further improve the properties of the resin and to lower the production costs for the resin moldings, for example, by simplifying the process of molding the resin. For this, if large-sized products of the resin, which have heretofore been produced through injection molding, could be produced through blow molding, the production costs could be greatly reduced.

However, the conventional polypropylene has a low melt tension and a low melt visco-elasticity, and if it is subjected to large-size blow molding, the stability of its parison is poor, thereby often causing a phenomenon of drawing down. For these reasons, therefore, it is difficult to produce large-sized products of the polymer through blow molding. If the polymer is modified to have an increased molecular weight in order to increase its melt tension, the melt fluidity of the polymer is lowered, thereby causing another problem that the polymer could no more apply to moldings having a complicated shape.

As so mentioned hereinabove, extrusion moldability of polypropylene must be improved in order to further enlarge the field where the polymer is usable. For this, heretofore, various attempts have been made for improving the melt workability of polyolefins, for example, by increasing the melt visco-elasticity thereof.

In general, introducing long-chain branches into polymer chains improves the melt workability of the resulting polymers due to the branches introduced. In the field of so-called composite materials comprising different types of polymers, branched polymers of which the monomers for the branched chains are different from those for the main polymer chain act to lower the surface tension between those different types of polymers to thereby improve the dispersibility of the polymers in the composite materials, and are effective for making the composite materials have contradictory properties of impact resistance and stiffness. In addition, as having a microscopic phase-separation structure, the branched polymers are applicable to various elastomers. However, in the field of polyolefins, the introduction of branched chains into the polymers is limited, and the applications of the polymers are limited. If the limitation on the introduction of branched chains into polyolefins could be removed, it is expected that the applications of polyolefins could be greatly expanded because of the intrinsic good mechanical properties and environmental affinity, such as typically recyclability, of the polymers.

For this, various proposals have heretofore been made, including, for example, (1) a method of mixing a high-molecular weight, high-density polyethylene having a high melt tension with polypropylene (see Japanese Patent Publication (JP-A) Hei-6-55868); (2) a method of mixing a high-density polyethylene having a high melt tension, which is prepared in the presence of a chromium catalyst, with polypropylene (see Japanese Patent Application (JP-A) Hei-8-92438); (3) a method of mixing a low-density polyethylene to be prepared through ordinary high-pressure radical polymerization, with polypropylene; (4) a method of exposing ordinary polypropylene to light to thereby make it have an increased melt tension; (5) a method of exposing ordinary polypropylene to light in the presence of a crosslinking agent or a peroxide to thereby make it have an increased melt tension; (6) a method of grafting ordinary polypropylene with a radical-polymerizing monomer such as styrene; and (7) a method of copolymerizing propylene and polyenes (see JP-A Hei-5-194778 and Hei-5-194779).

However, in the methods (1) to (3), since the elasticity, the strength and the heat resistance of the melt tension-improving component added are low, the component inevitably interferes with the intrinsic characteristics of polypropylene and also with the properties of the foams to be formed from the polymer mixture. In the methods (4) and (5), it is difficult to control the side reaction, crosslinking to give gel, which shall have negative influences of the outer appearance and the mechanical properties of the foams to be formed. In addition, in those, it is difficult to freely control the degree of crosslinking between the molecules that influence on the moldability of the polymer mixture, through polymer reaction, and the controllable range for the degree of crosslinking in question is problematically narrow. The method (6) is problematic in that it detracts from the chemical stability of polypropylene, and that styrene-based graft polymers formed therein are not recyclable. The method (7) is problematic in that it is not so much effective for increasing the melt tension of the copolymer formed and that the copolymerization may give gel.

On the other hand, for impact-resistant polypropylene compositions, used are mixtures of a relatively low-molecular, high-stereospecific propylene homopolymer and a relatively high-molecular ethylene/propylene random copolymer. In wrapping films, used are mixtures of a propylene homopolymer and a propylene-based random copolymer as prepared by copolymerizing propylene and ethylene or any other a-olefin. This is because polypropylene has a relatively high melting point and must be combined with the copolymer in order to make it have good heat-sealability even at low temperatures for use in wrapping films. In those mixtures, however, the two components, propylene homopolymer and propylene-based random copolymer are hardly miscible with each other, since they differ in the crystallinity and in the molecular weight, resulting in that the wrapping films made from the mixtures have low impact resistance and are not stiff. For improving the miscibility of the two components in the mixtures, it is known that adding an additional component miscible with the both components, or that is, a block or graft copolymer having polypropylene blocks and propylene/other -olefin (including ethylene) blocks to the mixtures is effective.

Recently, ethylene-based polymers have been proposed, which are produced in the presence of a catalyst system comprising a metallocene catalyst and an aluminoxane or the like, and which have high melt tension even though having a narrow molecular weight distribution (see JP-A Hei-4-213306). Other ethylene-based polymers have been disclosed, which are produced in the presence of a constrained geometric addition-type catalyst and which have good melt tension even though having a narrow molecular weight distribution (see JP-A Hei-3-163088). Those polymers suggest the presence of long-chain branches existing therein. Regarding the formation of the long-chain branches in those polymers, a mechanism has been proposed which is such that ethylene-based polymer precursors having a vinyl group at the molecular chain terminal are formed as macromonomers during the polymerization and those macromonomers are further polymerized to give the ethylene-based polymers with such long-chain branches.

On the other hand, branched polyolefins have been disclosed, which have a main chain of a homopolymer or copolymer of a-olefin(s) each having from 2 to 30 carbon atoms and have side chains of a homopolymer or copolymer of a-olefin(s) having not smaller than 250 carbon atoms (see JP-A Hei-8-502303). In this publication, shown is a method for forming the side chains of the branched olefins via formation of vinyl-terminated macromonomers.

In the publication, they say that the macromonomers are formed through transference of b-hydrogens. According to their theory, however, propylene polymerization accompanied by b-hydrogen transference shall give an internal olefin or vinylidene structure but does not produce vinyl-terminated macromonomers. On the other hand, for producing macromonomers except ethylene-based ones, suggested is a method of adding ethylene to the reaction system in the "last" stage of polymerization to thereby "cap" the macromonomers with ethylene. In this, it is obvious that ethylene is indispensable for producing the macromonomers. In addition, since the speed of the chain transfer reaction in the polymerization system is extremely high in this method, the ethylene introduction into the system shall give block copolymers with ethylene, without being accompanied by b-hydrogen transference to give block macromonomers. In fact, in this method, formed are macromonomers of ethylene alone. From those facts, it is obvious that the technique disclosed in the publication is applicable to only the production of ethylene-based polymers only. Nothing is disclosed and suggested in the publication for producing macromonomers of propylene or a-olefins higher than propylene.

For introducing propylene-based branched chains into polyolefin-based polymers, disclosed are (8) a method of copolymerizing a propylene oligomer as produced in the presence of a catalyst system comprising a combination of a specific metallocene catalyst and an aluminoxane or the like (see JP-B Hei-8-2554071); and (9) a method of producing vinyl-terminated ethylene-propylene copolymers usable as macromonomers, in the presence of a catalyst system comprising a combination of a specific metallocene catalyst and an aluminoxane or the like (see JP-A Hei-5-320260).

In the method (8), however, the propylene macromonomers to be introduced for branched chains are low oligomers of from 2-mers to 6-mers or so. Therefore, it is extremely difficult to mold the polymers produced in the method (8). On the other hand, in the method (9), the vinyl-terminated ethylene-propylene copolymers produced have a low propylene content of from 10 to 30 mol % or so, and substantially have no stereospecificity. Therefore, the copolymers produced therein have low elasticity, low mechanical strength and low heat resistance, and shall inevitably lose the intrinsic good characteristics of polypropylene.

SUMMARY OF THE INVENTION

Given that situation, the present invention is to provide propylene-based copolymers, of which the physical properties are comparable to or better than those of conventional propylene-based copolymers, and which are characterized in that they have high melt tension, high melt visco-elasticity and high melt fluidity, that they have good melt workability and are therefore favorably used in large-size blow molding and extrusion foaming, that they are usable as miscibility improvers for propylene homopolymers and propylene-based block and/or random copolymers, and that they are usable in polyolefin-based composite materials for effectively improving the properties of the composite materials and for elastomerizing them.

We, the present inventors have assiduously studied so as to obtain branched polyolefins with good melt workability, and, as a result, have found that specific olefin-based polymers meet the requirement.

The first aspect of the specific olefin-based polymers is a propylene-based polymer characterized by a specific relationship between the melt index and the molecular weigh distribution thereof and a specific relationship between the melt tension and the limiting viscosity thereof, and by having a predetermined limiting viscosity, which includes propylene homopolymers and propylene-based copolymers having graft chains of a copolymer of propylene with ethylene and/or a-olefin(s) having 4 or more carbon atoms.

The second aspect is a branched polyolefin of which the main chain and the side chains each have a specific structure and in which the stereospecificity of the side chains falls within a specific range.

The third aspect is a branched polyolefin characterized by having a predetermined specific propylene content and a predetermined limiting viscosity, and by a specific relationship between the melt index and the molecular weight distribution thereof and a specific relationship between the melt tension and the melt index thereof, and further characterized by having graft chains of a copolymer of ethylene with at least one selected from a-olefins having from 3 to 20 carbon atoms, cyclic olefins and styrenes.

On the basis of the findings noted above, we, the inventors have completed the present invention.

Specifically, the invention provides olefin-based polymers mentioned below.

(1) A propylene-based polymer characterized in that (a) the ratio of $MI_5/MI_{2.16}$, $MI_5$ being the melt index of the polymer (g/10 min) as measured at a temperature of 230° C. and under a load of 5.0 kg, and $MI_{2.16}$ being the melt index thereof (g/10 min) as measured at the same temperature but under a load of 2.16 kg, and the ratio of Mw/Mn, Mw being the weight-average molecular weight of the polymer and Mn being the number-average molecular weight thereof both measured through gel permeation chromatography, satisfy the following requirement:

$$MI_5/MI_{2.16} \geq 0.240 \times Mw/Mn + 3.1 \qquad (I),$$

that (b) the melt tension, MS (g), of the polymer as measured at a temperature of 230° C., and the limiting viscosity [h] (dl/g) thereof as measured in a solvent of tetracycline at a temperature of 135° C. satisfy the following requirement:

$$\log MS \geq 3.17 \times \log[h] - 0.68 \qquad (II),$$

and that said limiting viscosity [h] falls between 0.1 and 15.0 dl/g.

As one embodiment of the propylene-based polymer includes, for example, mentioned is a propylene-based copolymer having graft chains of a copolymer of propylene with ethylene and/or a-olefin(s) having 4 or more carbon atoms, which preferably has a ratio Mw/Mn falling between 1.5 and 4.0 and has a content of the copolymer moiety of propylene with ethylene and/or a-olefin(s) having 4 or more carbon atoms of being not smaller than 3% by weight. The propylene-based copolymer can be used as a miscibility improver for propylene homopolymers and propylene-based block and/or random copolymers.

As another embodiment, mentioned is a propylene-based homopolymer, which preferably has a ratio of Mw/Mn falling between 1.5 and 4.5 and has a melting point as measured through differential scanning calorimetry of falling between 120 and 165° C.

(2) A branched polyolefin having a main chain of a polymer of at least one or more monomers selected from ethylene, a-olefins having from 4 to 20 carbon atoms, cyclic olefins and styrenes, and side chains of a propylene homopolymer or a copolymer of propylene with at least one or more monomers selected from ethylene, a-olefins having from 4 to 20 carbon atoms, cyclic olefins and styrenes, wherein the side chains have an isotactic triad fraction [mm] of not smaller than 80%, said fraction indicating the stereospecificity of the propylene-bonding site in the side chains.

(3) A branched polyolefin having a main chain of a polymer of at least one or more monomers selected from a-olefins having from 2 to 20 carbon atoms, cyclic olefins and styrenes, and side chains of a copolymer of propylene with at least one or more monomers selected from ethylene, a-olefins having from 4 to 20 carbon atoms, cyclic olefins and styrenes, wherein the side chains have an isotactic triad fraction [mm] of not smaller than 80%, said fraction indicating the stereospecificity of the propylene-bonding site in the side chains.

Of the branched polyolefins (2) and (3), preferred are those having a weight-average molecular weight of from 5,000 to 1,000,000 as measured through gel permeation chromatography (GPC) in terms of polyethylene; those of which the melt tension, MS, is larger than the melt tension, MS, of linear polyolefins that have the same copolymerization composition and the same melt index, MI, as those of the branched polyolefins; those of which the melt tension, MS (g), and the melt index, MI (g/10 min), both measured at a temperature of 230° C. satisfy the following requirement:

$$\log MS \geq -0.907 \times \log MI + 0.375 \qquad (I),$$

and of which the propylene content falls between 60 and 99.9 mol %; and those in which the constituent monomers constituting the main chain are the same as those constituting the side chains and which contain substantially no gel.

(4) A branched polyolefin characterized in that (a) its propylene content falls between 60 and 99.9% by weight, that (b) the ratio of $MI_5/MI_{2.16}$, $MI_5$ being the melt index of the polymer (g/10 min) as measured at a temperature of 230° C. and under a load of 5.0 kg, and $MI_{2.16}$ being the melt index thereof (g/10 min) as measured at the same temperature but under a load of 2.16 kg, and the ratio of Mw/Mn, Mw being the weight-average molecular weight of the polymer and Mn being the number-average molecular weight thereof both measured through gel permeation chromatography, satisfy the following requirement:

$$MI_5/MI_{2.16} \geq 0.240 \times Mw/Mn + 3.10 \qquad (I),$$

that (c) its melt tension, MS (g), and its melt index, MI (g/10 min), both measured at a temperature of 230° C. satisfy the following requirement:

$$\log MS > -0.907 \times \log MI + 0.375 \qquad (II),$$

that its limiting viscosity [h] as measured in a solvent of tetracycline at a temperature of 135° C. falls between 0.1 and 15.0 dl/g, and that it has a main chain of a polymer (except propylene homopolymers) of at least one or more monomers selected from a-olefins having from 2 to 20 carbon atoms, cyclic olefins and styrenes, and graft chains of a copolymer of ethylene with one or more monomers selected from a-olefins having from 3 to 20 carbon atoms, cyclic olefins and styrenes.

Of the branched polyolefins, preferred are those having a ratio, Mw/Mn, of falling between 1.5 and 4.0, and having a content of the copolymer moiety of ethylene with one or more monomers selected from a-olefins having from 3 to 20 carbon atoms, cyclic olefins and styrenes, of being not smaller than 3% by weight.

The branched polyolefins of those types are favorably used as miscibility improvers for propylene homopolymers and propylene-based block and/or random copolymers.

DETAILED DESCRIPTION OF THE INVENTION

The propylene-based polymer of the first aspect of the invention is a long-chain, branched propylene-based polymer which has a narrow molecular weight distribution and of which the non-Newtonian melt fluidity and the melt tension can be well controlled. The polymer has good balance of physical properties and workability. Concretely, the polymer includes, for example, a long-chain, branched propylene homopolymer to be produced from propylene monomer only, and a long-chain, branched propylene-based copolymer to be produced from propylene, and ethylene and/or a-olefin(s) having 4 or more carbon atoms.

The propylene-based polymer has the following properties.

First, it is necessary that the ratio of $MI_5/MI_{2.16}$, $MI_5$ being the melt index of the polymer (g/10 min) as measured at a temperature of 230° C. and under a load of 5.0 kg, and $MI_{2.16}$ being the melt index thereof (g/10 min) as measured at the same temperature but under a load of 2.16 kg, and the ratio of Mw/Mn, Mw being the weight-average molecular weight of the polymer and Mn being the number-average molecular weight thereof both measured through gel permeation chromatography, satisfy the following requirement:

$$MI_5/MI_{2.16} \geq 0.240 \times Mw/Mn + 3.1 \quad (I).$$

If the ratio $MI_5/MI_{2.16}$ is smaller than "0.240×Mw/Mn+3.1", the polymer has poor melt workability, and could not attain the object of the invention. In view of the melt workability of the polymer;
preferably, $$MI_5/MI_{2.16} \geq 0.240 \times Mw/Mn + 3.8$$

more preferably, $$MI_5/MI_{2.16} \geq 0.240 \times Mw/Mn + 4.5.$$

The melt index, MI, of the polymer is measured according to ASTM D1238, at a temperature of 230° C. and under a load of 2.16 kg. To measure the MI of the polymer, an antioxidant of a 1/1 (by weight) mixture of Irganox 1010 and BHT is previously added to the polymer in an amount of 4000 ppm by weight. The temperature for the measurement is generally 230° C., but depending on the constituent monomers of the polymer, it may be freely varied within a range of from 190 to 300° C. For the polymer having a large molecular weight and a low melt fluidity, the temperature may be high within the defined range.

The ratio, Mw/Mn is derived from the weight-average molecular weight (Mw) of the polymer and the number-average molecular weight (Mn) thereof in terms of polyethylene, both measured through gel permeation chromatography (GPC) using the device mentioned below under the condition also mentioned below.
Device
  Waters ALC/GPC 150 C. with two columns of Toso's TSK MH+GMH 6
Condition
  Temperature: 135° C.
  Solvent: 1,2,4-trichlorobenzene
  Flow rate: 1.0 ml/min Next, it is necessary that the melt tension, MS (g), of the polymer as measured at a temperature of 230° C., and the limiting viscosity [h] (dl/g) thereof as measured in a solvent of tetracycline at a temperature of 135° C. satisfy the following requirement:

$$\log MS \geq 3.17 \times \log[h] - 0.68 \quad (II).$$

If the value log MS is smaller than "3.17×log[h]−0.68", the polymer has poor melt workability, and could not attain the object of the invention. In view of the melt workability of the polymer;
preferably, $$\log MS \geq 3.17 \times \log[h] - 0.57$$

more preferably, $$\log MS \geq 3.17 \times \log[h] - 0.46$$

even more preferably, $$\log MS \geq 3.17 \times \log[h] - 0.35.$$

In addition, the limiting viscosity [h] of the polymer must be between 0.1 and 15.0 dl/g. If its limiting viscosity [h] is smaller than 0.1 dl/g, the polymer has poor melt workability and poor mechanical strength; but if larger than 15.0 dl/g, the melt viscosity of the polymer is too high and the melt workability thereof is lowered. In view of the balance between the melt workability and the mechanical strength of the polymer, the limiting viscosity [h] of the polymer preferably falls between 0.4 and 10.0 dl/g, more preferably between 0.6 and 6.0 dl/g.

The melt tension, MS, of the polymer is measured under the condition mentioned below, using Capillograph IB Model manufactured by Toyo Seiki KK.
  Capillary: diameter 2.095 mm, length 8.0 mm
  Cylinder diameter: 9.6 mm
  Cylinder extrusion rate: 10 mm/min
  Winding rate: 3.14 m/min
  Temperature: 230° C.

Preferably, the propylene-based polymer of the invention has a ratio, Mw/Mn, falling between 1.5 and 4.5, Mw being the weight-average molecular weight of the polymer and Mn being the number-average molecular weight thereof. If the ratio Mw/Mn is larger than 4.5, the molecular weight distribution of the polymer will be too large, and the polymer could not have good physical properties. Polymers having a ratio Mw/Mn of smaller than 1.5 are substantially difficult to produce. In view of its physical properties, the polymer preferably has a ratio Mw/Mn of falling between 1.5 and 4.0, more preferably between 1.5 and 3.5.

It is also desirable that the polymer has a melting point, Tm, as measured through differential scanning calorimetry (DSC), of falling between 120 and 165° C. If its melting point is lower than 120° C., the polymer has poor heat resistance; but if higher than 165° C., the polymer requires too high molding temperatures and is uneconomical. In view of its heat resistance and economical moldability, the polymer preferably has a melting point falling between 130 and 165° C.

The melting point, Tm, of the polymer is measured according to the method mentioned below, using a differential scanning calorimeter "DSC-7 Model" manufactured by Perkin-Elmer Co. Briefly, in DSC-7, a sample sheet as obtained by hot-pressing the polymer at 190° C. is melted at 200° C. for 5 minutes, then cooled to 20° C. at a cooling rate of 10° C./min, kept at the temperature for 5 minutes, and then again heated at a heating rate of 10° C./min. From the heat absorption peak seen in this cycle, obtained is the melting point, Tm, of the polymer.

It is desirable that the propylene-based polymer of the invention has a reduced amount of low-molecular weight components and a reduced amount of atactic moieties. For example, the diethyl ether-soluble content of the polymer is preferably not larger than 2% by weight, more preferably not larger than 1% by weight. The diethyl ether-soluble content is measured according to the method mentioned below.

Briefly, about 3 g of a powdery polymer sample is put into a Soxhlet's extractor, and extracted with 160 ml of diethyl ether for 6 hours. From the resulting extract, evaporated is the extraction solvent, using a rotary evaporator. Then, from the resulting residue, recovered is a diethyl ether-soluble component through vacuum drying, and its weight is measured.

The propylene-based polymer of the invention encompasses propylene-based copolymers. As the propylene-based copolymers, preferred are those having graft chains of a copolymer of propylene with ethylene and/or a-olefin(s) having 4 or more carbon atoms, especially preferred are those having a main chain of a propylene homopolymer and graft chains of the copolymer noted above. Preferably, the grafted copolymer content of those copolymers is not smaller than 3.0% by weight. If the content is smaller than 3.0% by weight, the copolymers will lose good balance of physical properties and melt workability, and could not satisfactorily act as miscibility improvers for propylene homopolymers and propylene-based block or graft copolymers. On the other hand, however, if the content is too large, the copolymers will lose the intrinsic properties of propylene-based resins. In consideration of the physical properties, the melt workability and the function as such miscibility improvers of the copolymers, the copolymer moiety content of the copolymers preferably falls between 3.5 and 50% by weight, more preferably between 4.0 and 30% by weight.

Where the graft chains of the copolymers are of a copolymer of propylene with ethylene and/or a-olefin(s) having 4 or more carbon atoms, their contents may be obtained according to the method to be mentioned hereinunder.

In the propylene-based copolymers, the comonomer unit content, not including propylene, of the copolymer moiety of the graft chains may be generally from 1.0 to 50% by weight, but preferably from 2.0 to 30% by weight.

The comonomers include ethylene and a-olefins having 4 or more carbon atoms, such as butene-1, pentene-1, 4-methyl-pentene-1, hexene-1, octene-1, decene-1, dodecene-1, tetradecene-1, hexadecene-1, octadecene-1, eicosene-1, etc. One or more of those comonomers may be used either singly or as combined.

Methods for producing propylene-based polymers of the invention are not specifically defined, and employable herein is any and every method capable of producing propylene-based polymers that satisfy the requirements noted above. For example, for producing propylene homopolymers of the invention, a reactive macromonomer to be prepared by processing propylene in the presence of an olefin polymerization catalyst may be polymerized with propylene in the presence of an olefin polymerization catalyst. In this method, the intended propylene homopolymers can be produced efficiently. For producing propylene-based copolymers, for example, a reactive macromonomer to be prepared by reacting propylene with ethylene and/or a-olefin(s) having 4 o more carbon atoms in the presence of an olefin polymerization catalyst is polymerized with propylene in the presence of an olefin polymerization catalyst. In this method, the intended propylene-based copolymers can be produced efficiently.

The olefin polymerization catalyst to be used is not specifically defined, and various types of the catalyst are employable. Preferred is a metallocene catalyst that is composed of a transition metal compound and a compound capable of reacting with the metal compound to give an ionic complex. Some typical examples of those compounds are mentioned below.

As the transition metal compound, typically mentioned are compounds of a transition metal of the Group IV of the Periodic Table, which have a ligand comprising two substituted indenyl groups as crosslinked via one or two crosslinking groups in the 5-membered ring moiety. As the transition metal of the Group IV of the Periodic Table, preferred is any of titanium, zirconium or hafnium.

The indenyl skeleton-having compounds of a transition metal of the Group IV of the Periodic Table include, for example, (a) Hoechst, BASF-type complexes, and (b) double-crosslinked complexes.

As examples of the Hoechst, BASF-type complexes (a), mentioned are rac-dimethylsilylene-bis(2-methyl-4-phenylindenyl)zirconium dichloride, rac-dimethylsilylene-bis(2-methyl-5,6-benzoindenyl)zirconium dichloride, rac-ethylenebisindenyl zirconium dichloride, and titanium and hafnium compounds corresponding to those zirconium compounds. As examples of the double-crosslinked complexes (b), mentioned are (1,2'-ethylene) (2,1'-ethylene)-bis(4,7-dimethylindenyl)zirconium dichloride, (1,2'-ethylene) (2,1'-ethylene)-bis(4-phenylindenyl)zirconium dichloride, and titanium and hafnium compounds corresponding to those zirconium compounds.

The compound capable of reacting with the transition metal compound to give an ionic complex includes, for example, aluminium-oxy compounds, ionic compounds composed of a cation and an anion of an element to which are bonded a plurality of groups, and Lewis acids. Of those, preferred are aluminium-oxy compounds, especially preferred are aluminoxanes. As examples of the aluminoxanes, mentioned are methylaluminoxane, ethylaluminoxane, n-propylaluminoxane, isobutylaluminoxane, methyl-ethylaluminoxane, methyl-n-propylaluminoxane, methyl-isopropylaluminoxane, ethyl-n-propylaluminoxane, ethyl-isopropylaluminoxane, and mixtures of two or more of these.

To produce the propylene macromonomer in the method noted above, it is desirable to use a single reactor in which are produced the macromonomer and then the propylene homopolymer in a continuous manner. Apart from this, however, the macromonomer only is first prepared, and the thus-prepared macromonomer may be added to propylene to produce the propylene homopolymer. In a single-stage polymerization, if desired, the macromonomer and the propylene homopolymer may be produced at the same time. In these cases, the catalyst for producing the propylene homopolymer is preferably the same as that for producing the macromonomer, but the two may differ.

The polymerization method is not specifically defined, for which, for example, employable is any of slurry polymerization, gaseous-phase polymerization, bulk polymerization, solution polymerization or suspension polymerization. For the polymerization, usable is any ordinary chain-transferring agent such as hydrogen to thereby control the molecular weight of the polymer to be produced.

In the solution polymerization or slurry polymerization, a solvent is used. The solvent is not specifically defined, and employable is any and every solvent that is inactive to the polymerization. For example, the solvent includes aromatic hydrocarbons such as benzene, toluene, xylene, etc.; aliphatic hydrocarbons such as pentane, hexane, heptane, octane, etc.; and alicyclic hydrocarbons such as cyclopentane, cyclohexane, etc.

The polymerization temperature may be suitably selected from the range generally falling between 0 and 250° C., depending on the polymerization method employed. The polymerization pressure may be suitably selected from the range generally falling between 0.01 and 100 kg/cm$^2$G, but preferably between 0.2 and 60 kg/cm$^2$G. The polymerization time may fall generally between 1 minute and 10 hours or so.

The physical properties of the propylene-based polymer of the invention thus produced in the manner noted above are comparable to or better than those of any conventional propylene-based polymers, and the polymer of the invention has high melt tension, high melt visco-elasticity, and high melt fluidity, and has good melt workability. Therefore, the polymer of the invention is favorably used in large-size blow molding, extrusion foaming and the like.

The propylene-based copolymer of the invention having graft chains of a copolymer of propylene with ethylene and/or a-olefin(s) having 4 or more carbon atoms is favorably used as a miscibility improver for propylene homopolymers and propylene-based random and/or block copolymers (random and/or block copolymers of propylene with ethylene and/or a-olefin(s) having 4 or more carbon atoms).

Now, the second aspect of the invention is described in detail hereinunder.

The branched polyolefin of the invention is composed of a main chain and side chains both having specific structures, and is produced from a-olefins, cyclic olefins and/or styrenes. The non-Newtonian melt fluidity and the melt tension of the polyolefin are well controlled, and the polyolefin has well-balanced physical properties and workability. The polyolefin is characterized by the following structures and properties.

Specifically, the main chain and the side chains of the branched polyolefin of the invention are characterized in that ① the main chain is of a polymer of at least one or more monomers selected from ethylene, a-olefins having from 4 to 20 carbon atoms, cyclic olefins and styrenes, while the side chains are of a propylene homopolymer or a copolymer of propylene with at least one or more monomers selected from ethylene, a-olefins having from 4 to 20 carbon atoms, cyclic olefins and styrenes, or ② the main chain is of a polymer of at least one or more monomers selected from a-olefins having from 2 to 20 carbon atoms, cyclic olefins and styrenes, while the side chains are of a copolymer of propylene with at least one or more monomers selected from ethylene, a-olefins having from 4 to 20 carbon atoms, cyclic olefins and styrenes.

The constitutive monomers, a-olefins for constituting the main chain and the side chains of the polyolefin include, for example, ethylene, propylene, 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, 1-eicosene, etc. The cyclic olefins include, for example, cyclopentene, cyclohexene, norbornene, 1-methylnorbornene, 5-methylnorbornene, 7-methylnorbornene, 5,6-dimethylnorbornene, 5,5,6-trimethylnorbornene, 5-ethylnorbornene, 5-propylnorbornene, 5-phenylnorbornene, etc. The styrenes include, for example, styrene; alkylstyrenes such as p-methylstyrene, m-methylstyrene, o-methylstyrene, 2,5-dimethylstyrene, p-t-butylstyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; and vinylbiphenyls such as 4-vinylbiphenyl, 3-vinylbiphenyl, 2-vinylbiphenyl, etc.

In the invention, one or more olefins noted above may be used either singly or as combined so as to satisfy the requirements ① or ②. Where two or more olefins are used, the olefins noted above may be combined in any desired manner.

The propylene content of the side chains in the polyolefin of the invention is preferably not smaller than 50 mol %, more preferably not smaller than 60 mol %, even more preferably not smaller than 70 mol %. Where the propylene content falls within the defined range, the polyolefin shall have good mechanical properties. The primary structure of the side chains is not specifically defined, and the side chains may be linear or may be branched to have long-chain branches.

Regarding the stereospecificity of the polyolefin, the monomers except ethylene that constitute the main chain may be structured in any desired manner to be atactic, isotactic or syndiotactic, and therefore, the main chain may be structured to be amorphous or crystalline. However, it is necessary that the side chains have an isotactic triad fraction [mm] of not smaller than 80%, the fraction indicating the stereospecificity of the propylene-bonding site in the side chains. If the fraction is smaller than 80%, the mechanical strength of the polyolefin will be unfavorably poor. In view of the mechanical strength of the polymer, the fraction is preferably not smaller than 85%, more preferably not smaller than 90%.

The isotactic triad fraction [mm] as referred to herein indicates the isotactic fraction of the polymer in terms of the triad unit in the polypropylene molecular chain, which is measured through $^{13}C$ nuclear magnetic resonance spectrometry described in "Polymer Handbook" (edited by the Polymer Analysis Research Association of the Japan Analytic Chemistry). The peak assignment determination in the $^{13}C$ nuclear magnetic resonance spectrometry follows the proposal made by A. Zambelli et al., in "Macromolecules, 8, 687 (1975)".

It is desirable that the weight-average molecular weight, Mw, of the branched polyolefin of the invention falls between 5,000 and 1,000,000, but is preferably not smaller than 10,000, more preferably not smaller than 15,000, even more preferably not smaller than 20,000. If the weight-average molecular weight is smaller than 5,000, the mechanical strength of the polymer is unfavorably low.

The molecular weight distribution of the branched polyolefin of the invention is not specifically defined, but, in general, the ratio of the weight-average molecular weight, Mw, of the polymer to the number-average molecular weight, Mn, thereof, Mw/Mn, may fall between 1.5 and 30, preferably between 1.5 and 15, more preferably between 1.5 and 10, even more preferably between 1.5 and 5, further preferably between 1.5 and 4.5. Having the ratio within the defined range, the polymer may have good mechanical strength.

In general, the side chains of the branched polyolefin each have a chain length of from 100 to 40,000 carbon atoms, or the macromonomers to give the side chains have a weight-average molecular weight of from 2,000 to 500,000.

The number of the branches to be in the polymer may be generally from 0.001 to 10/1,000 carbon atoms.

The weight-average molecular weight referred to hereinabove is measured through gel permeation chromatography (GPC), like that in the first aspect of the invention mentioned above. For this, the same device and the same condition as those in the first aspect of the invention are used.

It is desirable that the melt tension, MS (branch), of the branched polyolefin of the invention is larger than the melt tension, MS (linear), of a linear polyolefin having the same copolymerization composition and the same melt index, MI, as those of the branched polyolefin. Namely, it is desirable that;

MS (branch)>MS (linear).

Falling within the defined range, the polymer has good melt workability. In view of the melt workability of the polymer;

preferably,

MS (branch) ≧ 1.03 MS (linear), more preferably,

MS (branch) ≧ 1.05 MS (linear), even more preferably,

MS (branch) ≧ 1.07 MS (linear), further preferably,

MS (branch) ≧ 1.09 MS (linear).

The linear polyolefin referred to herein includes all polyolefins to be produced indispensably in the presence of a titanium compound and an organic aluminium compound, such as polypropylene, ethylene-propylene copolymers to be produced in the presence of an essential catalyst comprising titanium tetrachloride as carried by magnesium chloride and of a catalyst promoter of an organic aluminum compound; and also all polyolefins with no side chains having 50 or more carbon atoms. To determine and compare MS (branch) and MS (linear), prepared are linear polyolefins, of which the copolymerization composition and the melt index, MI, each are within the range of +/−5% of the copolymerization composition and the melt index, MI, respectively of the corresponding branched polyolefins.

It is also desirable that the melt tension, MS (g), and the melt index, MI (g/10 min), of the branched polyolefin of the invention, both measured at 230° C., satisfy the following requirement:

$$\log MS \geq -0.907 \times \log MI + 0.375 \qquad (I),$$

and that the propylene content of the polymer falls between 60 and 99.9 mol %.

If the value log MS is smaller than "−0.907×log MI+0.375", the melt workability of the polymer is unfavorably poor. In view of the melt workability of the polymer; more preferably, $$\log MS \geq -0.907 \times \log MI + 0.450,$$

even more preferably, $$\log MS \geq -0.907 \times \log MI + 0.50,$$

further preferably, $$\log MS \geq -0.907 \times \log MI + 0.60.$$

The melt index, MI, and the melt tension, MS, referred to herein are measured according to the same method and under the same condition as those referred to in the first aspect of the invention.

Depending on the structure of the main chain, examples of the branched polyolefin of the invention are mentioned below, which, however, are not limitative.

(1) Ethylene-based Polyolefins

① Branched polyethylenes composed of a main chain of polyethylene and branches of an isotactic polypropylene or a copolymer of propylene with ethylene and/or a-olefin(s) having from 4 to 20 carbon atoms.

② Branched polyethylenes composed of a main chain of polyethylene and branches of a copolymer of propylene with at least one of cyclic olefins and styrenes.

③ Branched polyethylenes composed of a main chain of a copolyethylene of ethylene with at least one of a-olefins having from 4 to 20 carbon atoms, cyclic olefins and styrenes, and branches of an isotactic polypropylene or a copolymer of propylene with ethylene and/or a-olefin(s) having from 4 to 20 carbon atoms.

④ Branched polyethylenes composed of a main chain of a copolyethylene of ethylene with at least one of a-olefins having from 4 to 20 carbon atoms, cyclic olefins and styrenes, and branches of a copolymer of propylene with at least one of cyclic olefins and styrenes.

The branched polyethylenes noted above are crystalline or amorphous, of which the crystalline ones generally have a melting point falling between 60 and 135° C. The ethylene content of the main chain in those is larger than 50%.

(2) Propylene-based Polyolefins

① Branched polypropylenes composed of a main chain of polypropylene and branches of an isotactic polypropylene, in which the main chain has stereospecificity of an atactic or syndiotactic structure.

② Branched polypropylenes composed of a main chain of polypropylene and branches of a copolymer of propylene with ethylene and/or a-olefin(s) having from 4 to 20 carbon atoms, in which the main chain has stereospecificity of an atactic, syndiotactic or isotactic structure.

③ Branched polypropylenes composed of a main chain of polypropylene and branches of a copolymer of propylene with at least one of cyclic olefins and styrenes, in which the main chain has stereospecificity of an atactic, syndiotactic or isotactic structure.

④ Branched polypropylenes composed of a main chain of a copolypropylene of propylene with at least one of ethylene, a-olefins having from 4 to 20 carbon atoms, cyclic olefins and styrenes, and branches of an isotactic polypropylene or a copolymer of propylene with ethylene and/or a-olefin(s) having from 4 to 20 carbon atoms, in which the main chain has stereospecificity of an atactic, syndiotactic or isotactic structure.

⑤ Branched polypropylenes composed of a main chain of a copolypropylene of propylene with at least one of ethylene, a-olefins having from 4 to 20 carbon atoms, cyclic olefins and styrenes, and branches of a copolymer of propylene with at least one of cyclic olefins and styrenes, in which the main chain has stereospecificity of an atactic, syndiotactic or isotactic structure.

The branched polypropylenes noted above are crystalline or amorphous, of which the crystalline ones generally have a melting point falling between 60 and 163° C. The propylene content of the main chain in those is larger than 50%.

(3) Higher a-olefin-based Polyolefins

① Branched polyolefins composed of a main chain of a polymer of a-olefin(s) having from 4 to 20 carbon atoms and branches of an isotactic polypropylene or a copolymer of propylene with ethylene and/or a-olefin(s) having from 4 to 20 carbon atoms.

② Branched polyolefins composed of a main chain of a polymer of a-olefin(s) having from 4 to 20 carbon atoms and branches of a copolymer of propylene with at least one of cyclic olefins and styrenes.

③ Branched polyolefins composed of a main chain of a copolyolefin of an a-olefin having from 4 to 20 carbon atoms with at least one of a-olefins having from 4 to 20 carbon atoms except said olefin, cyclic olefins and styrenes, and branches of an isotactic polypropylene or a copolymer of propylene with ethylene and/or a-olefin(s) having from 4 to 20 carbon atoms.

④ Branched polyolefins composed of a main chain of a copolyolefin of an a-olefin having from 4 to 20 carbon atoms with at least one of a-olefins having from 4 to 20 carbon atoms except said olefin, cyclic olefins and styrenes, and branches of a copolymer of propylene with at least one of cyclic olefins and styrenes.

The branched polyolefins noted above are crystalline or amorphous, in which the main chain has stereospecificity of an atactic, syndiotactic or isotactic structure. The higher a-olefin content of the main chain in those is larger than 50%.

(4) Cyclic Olefin-based Polyolefins

① Branched cyclic polyolefins composed of a main chain of a cyclic polyolefin and branches of an isotactic polypropylene or a copolymer of propylene with ethylene and/or a-olefin(s) having from 4 to 20 carbon atoms.

② Branched cyclic polyolefins composed of a main chain of a cyclic polyolefin and branches of a copolymer of propylene with at least one of cyclic olefins and styrenes.

③ Branched cyclic polyolefins composed of a main chain of a cyclic copolyolefin of a cyclic olefin with at least one of a-olefins having from 2 to 20 carbon atoms and styrenes, and branches of an isotactic polypropylene or a copolymer of propylene with ethylene and/or a-olefin(s) having from 4 to 20 carbon atoms.

④ Branched cyclic polyolefins composed of a main chain of a cyclic copolyolefin of a cyclic olefin with at least one of a-olefins having from 2 to 20 carbon atoms and styrenes, and branches of a copolymer of propylene with at least one of cyclic olefins and styrenes.

The branched cyclic polyolefins noted above are crystalline or amorphous, in which the main chain has stereospecificity of an atactic, syndiotactic or isotactic structure. The cyclic olefin content of the main chain in those is larger than 50%.

(5) Styrene-based Polyolefins

① Branched polystyrenes composed of a main chain of polystyrene and branches of an isotactic polypropylene or a copolymer of propylene with ethylene and/or a-olefin(s) having from 4 to 20 carbon atoms.

② Branched polystyrenes composed of a main chain of polystyrene and branches of a copolymer of propylene with at least one of cyclic olefins and styrenes.

③ Branched polystyrenes composed of a main chain of a copolystyrene of styrene with at least one of a-olefins having from 2 to 20 carbon atoms, cyclic olefins and styrenes except said styrene, and branches of an isotactic polypropylene or a copolymer of propylene with ethylene and/or a-olefin(s) having from 4 to 20 carbon atoms.

④ Branched polystyrenes composed of a main chain of a copolystyrene of styrene with at least one of a-olefins having from 2 to 20 carbon atoms, cyclic olefins and styrenes except said styrene, and branches of a copolymer of propylene with at least one of cyclic olefins and styrenes.

The branched polystyrenes noted above are crystalline or amorphous, in which the main chain has stereospecificity of an atactic, syndiotactic or isotactic structure. The styrene content of the main chain in those is larger than 50%.

To produce the branched polyolefins of the invention, employable is any and every method capable of producing them that satisfy the requirements noted above. For example, according to a method comprising polymerizing a vinyl-terminated propylene-based macromonomer, which is prepared by polymerizing propylene, or propylene with at least one of ethylene, a-olefins having from 4 to 20 carbon atoms, cyclic olefins and styrenes, in the presence of an olefin polymerization catalyst, with propylene or propylene along with at least one of ethylene, a-olefins having from 4 to 20 carbon atoms, cyclic olefins and styrenes, in the presence of an olefin polymerization catalyst, the intended branched polyolefins are produced efficiently.

In this, various catalysts are employable for producing the propylene-based macromonomers and for copolymerizing the macromonomers. Of those, preferred are metallocene catalysts which have been referred to hereinabove for the first aspect of the invention. The same as those referred to hereinabove for the first aspect of the invention shall apply to typical examples of the catalysts for producing the propylene-based macromonomers and to those for copolymerizing the macromonomers, and detailed descriptions of those examples are omitted herein.

The process and the condition for the polymerization are not specifically defined, and those referred to hereinabove for the first aspect of the invention shall apply to the production of the macromonomers and to the polymerization thereof.

In the polymerization method of the invention, a single reactor may be used in which the propylene-based macromonomer and the branched polyolefin can be produced in a continuous manner. Apart from this, it is also possible to separately prepare the macromonomer, which is then added to the next polymerization system to give the intended branched polyolefin. In a single-stage polymerization, if desired, the macromonomer and the branched polyolefin may be produced at the same time. In these cases, the catalyst for producing the branched polyolefin and that for producing the macromonomer may be the same or different.

Now, the branched polyolefin of the third aspect of the invention is described in detail hereinunder.

The branched polyolefin of the invention is composed of a main chain of a polymer (except propylene homopolymers) of at least one or more monomers selected from a-olefins having from 2 to 20 carbon atoms, cyclic olefins and styrenes, and graft chains of a copolymer of ethylene with one or more monomers selected from a-olefins having from 3 to 20 carbon atoms, cyclic olefins and styrenes. This is a long-chain branched polyolefin, and is characterized in that its molecular weight distribution is narrow, that its non-Newtonian melt fluidity and melt tension are well controlled, and that it has well-balanced physical properties and workability. The branched polyolefin is further characterized by the following structures and properties.

First, the propylene content of the branched polyolefin must fall between 60 and 99.9% by weight. If the propylene content is smaller than 60% by weight, the heat resistance of the polymer is poor, and the polymer will be poorly miscible with other polyolefin resins. On the other hand, if the propylene content is larger than 99.9% by weight, the polymer shall have a too small amount of the component acting as a miscibility improver, resulting in that the miscibility-improving ability of the polymer is lowered. In view of the miscibility-improving ability and the heat resistance of the polymer, the propylene content is preferably from 65 to 99.5% by weight, more preferably from 70 to 99% by weight.

Next, the branched polyolefin must be such that the ratio of $MI_5/MI_{2.16}$, $MI_5$ being the melt index of the polymer (g/10 min) as measured at a temperature of 230° C. and under a load of 5.0 kg, and $MI_{2.16}$ being the melt index thereof (g/10 min) as measured at the same temperature but under a load of 2.16 kg, and the ratio of Mw/Mn, Mw being the weight-average molecular weight of the polymer and Mn being the number-average molecular weight thereof both measured through gel permeation chromatography, satisfy the following requirement:

$$MI_5/MI_{2.16} \geq 0.240 \times Mw/Mn + 3.10 \tag{I}$$

If the ratio $MI_5/MI_{2.16}$ is smaller than "0.240×Mw/Mn+ 3.10", the melt workability of the polymer is poor, and the polymer could not attain the object of the invention. In view of the melt workability of the polymer; preferably, $$MI_5/MI_{2.16} \geq 0.240 \times Mw/Mn + 3.50,$$

more preferably, $$MI_5/MI_{2.16} \geq 0.240 \times Mw/Mn + 3.86.$$

The device and the condition for gel permeation chromatography (GPC) to obtain the ratio Mw/Mn may be the same as those in the first aspect of the invention mentioned hereinabove.

In addition, the branched polyolefin must be such that its melt tension, MS (g), and its melt index, MI (g/10 min), both measured at a temperature of 230° C. satisfy the following requirement:

$$\log MS > -0.907 \times \log MI + 0.375 \qquad (II).$$

If the value log MS is not larger than "−0.907×log MI+0.375", the melt workability of the polymer is poor, and the polymer could not attain the object of the invention. In view of the melt workability of the polymer; preferably, $$\log MS > -0.907 \times \log MI + 0.40,$$

more preferably, $$\log MS > -0.907 \times \log MI + 0.45,$$

even more preferably, $$\log MS > -0.907 \times \log MI + 0.50.$$

Further, the branched polyolefin must be such that its limiting viscosity [h] as measured at a temperature of 135° C. falls between 0.1 and 15.0 dl/g. If the limiting viscosity [h] is smaller than 0.1 dl/g, the melt workability of the polymer is poor and the mechanical strength thereof is low. On the other hand, however, if it is larger than 15.0 dl/g, the melt viscosity of the polymer is so high that the melt workability thereof is lowered. In view of the balance of the melt workability and the mechanical strength of the polymer, the limiting viscosity [h] of the polymer is preferably from 0.4 to 10.0 dl/g, more preferably from 0.6 to 6.0 dl/g.

The melt index, MI, and the melt tension, MS, of the polymer are measured according to the same method and under the same condition as those in the first aspect of the invention mentioned hereinabove.

Preferably, the ratio, Mw/Mn, of the branched polyolefin of the invention, Mw indicating the weight-average molecular weight of the polymer noted above and Mn indicating the number-average molecular weight thereof, falls between 1.5 and 4.0. If the ratio Mw/Mn is larger than 4.0, the molecular weight distribution of the polymer is too broad, and the physical properties of the polymer will be not so good. On the other hand, polymers having a ratio Mw/Mn of smaller than 1.5 are substantially difficult to produce. In view of the physical properties of the polymer, more preferably, the ratio falls between 1.5 and 3.5.

The branched polyolefin of the invention has graft chains of a copolymer of ethylene with one or more monomers selected from a-olefins having from 3 to 20 carbon atoms, cyclic olefins and styrenes. Preferably, the copolymer moiety content of the polymer is not smaller than 3.0% by weight. If the content is smaller than 3.0% by weight, the balance of the physical properties and the melt workability of the polymer will be not good, and, in addition, the polymer could not well function as a miscibility improver for propylene homopolymers and propylene-based block and/or random copolymers. However, if the copolymer moiety content is too large, the polymer will lose the intrinsic properties of propylene-based resins. In consideration of the melt workability and the function as such a miscibility improver of the polymer, the copolymer moiety content of the polymer preferably falls between 3.5 and 50% by weight, more preferably between 4.0 and 30% by weight.

The content of the copolymer moiety composed of ethylene and at least one selected from a-olefins having from 3 to 20 carbon atoms, cyclic olefins and styrenes is obtained according to the method mentioned hereinunder.

In the branched polyolefin of the invention, the comonomer unit content of the copolymer moiety is generally from 1.0 to 50% by weight, but preferably from 2.0 to 30% by weight.

It is desirable that the branched polyolefin of the invention has a reduced amount of low-molecular weight components and a reduced amount of atactic moieties. For example, the diethyl ether-soluble content of the polymer is preferably not larger than 2% by weight, more preferably not larger than 1% by weight. The diethyl ether-soluble content is measured according to the method mentioned below.

Briefly, about 3 g of a powdery copolymer sample is put into a Soxhlet's extractor, and extracted with 160 ml of diethyl ether for 6 hours. From the resulting extract, evaporated is the extraction solvent, using a rotary evaporator. Then, from the resulting residue, recovered is a diethyl ether-soluble component through vacuum drying, and its weight is measured.

The main chain of the branched polyolefin of the invention is a homopolymer or copolymer of one or more monomers selected from ethylene; a-olefins having from 3 to 20 carbon atoms such as propylene, butene-1, pentene-1, 4-methyl-pentene-1, hexene-1, octene-1, decene-1, dodecene-1, tetradecene-1, hexadecene-1, octadecene-1, eicosene-1, etc.; cyclic olefins such as cyclopentene, cycloheptene, norbornene, 5-ethyl-2-norbornene, tetracyclodecene, etc.; and styrenes. However, this does not encompass propylene homopolymers.

To form the graft chains of the branched polyolefin of the invention, used are combinations of ethylene and one or more comonomers selected from a-olefins having from 3 to 20 carbon atoms such as those mentioned above, cyclic olefins such as those mentioned above, and styrenes.

To produce the long-chain branched polyolefin of the invention, employable is any and every method capable of producing it that satisfy the requirements noted above, and the method for producing it is not specifically defined. For example, where a reactive macromonomer to be prepared by reacting propylene and ethylene in the presence of an olefin polymerization catalyst is polymerized with propylene/ethylene in the presence of an olefin polymerization catalyst, the intended branched polyolefin is produced efficiently.

In this, various catalysts are employable for producing the propylene-based macromonomers and for copolymerizing the macromonomers. Of those, preferred are metallocene catalysts which have been referred to hereinabove for the first aspect of the invention. The same as those referred to hereinabove for the first aspect of the invention shall apply to typical examples of the catalysts for producing the propylene-based macromonomers and to those for copolymerizing the macromonomers, and detailed descriptions of those examples are omitted herein.

The process and the condition for the polymerization are not specifically defined, and those referred to hereinabove for the first aspect of the invention shall apply to the production of the macromonomers and to the polymerization thereof.

The physical properties of the propylene-based copolymers of the invention thus obtained in the manner mentioned above are comparable to or better than those of conventional propylene-based polymers, and the copolymers of the invention has high melt tension, high melt visco-elasticity and high melt fluidity, and has good melt workability. Therefore, the copolymers of the invention are favorably used in large-size blow molding, extrusion foaming and sheet-making.

In addition, since the graft chains of the copolymers of the invention are of a copolymer of ethylene with at least one or more selected from a-olefins having from 3 to 20 carbon atoms, cyclic olefins and styrenes, they are favorably used as miscibility improvers for propylene homopolymers and propylene-based random and/or block copolymers (random and/or block copolymers of propylene with ethylene and/or a-olefin (s) having 4 or more carbon atoms).

Now, the invention is described in more detail with reference to the following Examples, which, however, are not intended to restrict the scope of the invention.

To measure the physical properties of the olefin polymers obtained in the following Examples, an antioxidant of a 1/1 (by weight) mixture of Irganox 1010 and BHT was previously added to the polymer sample in an amount of 4000 ppm by weight, and the resulting mixture was tested according to the methods mentioned below.

(1) Melt Index ($MI_5$, $MI_{2.16}$)

According to ASTM D1238, $MI_5$ and $MI_{2.16}$ of the sample were measured at a temperature of 230° C. and under a load of 5.0 kg and 2.16 kg, respectively.

(2) Melt Tension (MS)

This was measured according to the method mentioned hereinabove.

(3) Limiting Viscosity ([h])

This was measured in a solvent of tetracycline at 135° C.

(4) Melting Point (Tm)

Using a differential scanning calorimeter, "DSC-7 Model" manufactured by Perkin Elmer Co., the melting point of each polymer was measured according to the method mentioned below. Briefly, in DSC-7, a sample sheet as obtained by hot-pressing each polymer at 190° C. was melted at 200° C. for 5 minutes, then cooled to 20° C. at a cooling rate of 10° C./min, kept at the temperature for 5 minutes, and then again heated at a heating rate of 10° C./min. From the heat absorption peak seen in this cycle, obtained was the melting point, Tm, of the polymer.

(5) Weight-average Molecular Weight (Mw), and Molecular Weight Distribution (Mw/Mn)

These were obtained according to the method of gel permeation chromatography (GPC) mentioned hereinabove.

(6) Stereospecificity [mm]

This was obtained-according to the method mentioned hereinabove.

(7) Propylene Content

This was obtained from the ratio of methyl to methylene appearing in $^1$H-NMR spectral pattern.

(8) Terminal Vinyl Group

A film formed by thermal pressing of a polymer sample was subjected to IR spectrometry, and in the resulting IR pattern, the presence or absence of the absorption at 907 $cm^{-1}$ was checked to confirm the presence or absence of the terminal vinyl group in the polymer sample.

The following Examples 1 to 6 are to demonstrate the first aspect of the invention, and the following Comparative Examples 1 to 3 are to be compared with the first aspect of the invention.

EXAMPLE 1

(1) Production of Ethylene/propylene Copolymerized Macromonomer 600 ml of dry toluene was put into a 1.6-liter stainless pressure autoclave equipped with a stirrer, along with a toluene solution of 1.45 mols/liter of methylaluminoxane (manufactured by Tosoh-Akuzo Co.) in an amount of 6 mmols in terms of aluminium atom, in a nitrogen stream. The contents were stirred at 500 rpm at a controlled temperature of 20° C., to which was added propylene until saturation at a gauge pressure of 7.0 $kg/cm^2G$. Next, ethylene was added thereto until saturation at a partial pressure of 2.0 $kg/cm^2$. Next, 20 ml of a toluene solution containing 20 μmols of bispentamethylcyclopentadienyl hafnium dichloride ($Cp*_2HfCl_2$) was introduced into the autoclave through a balance line connected with the autoclave, and the monomers were copolymerized at 20° C. In this stage, ethylene was continuously introduced into the system for 10 minutes whereby the total pressure was kept constant.

After the reaction, the non-reacted monomers were expelled from the autoclave through degassing, and then completely removed therefrom through nitrogen purging, and thereafter the catalyst was inactivated with a small amount of methanol.

The reaction mixture containing ethylene/propylene copolymerized macromonomer was recovered, and deashed with diluted HCl/methanol/water. Then, this was washed five times with ion-exchanged water, dried with anhydrous magnesium sulfate, and evaporated to dryness to recover the ethylene/propylene copolymerized macromonomer. Its yield was 59.5 g.

(2) Copolymerization of Propylene with Ethylene/propylene Copolymerized Macromonomer The macromonomer obtained in (1) was dissolved in toluene, from which was fractionated the part soluble in toluene at room temperature. The amount of the soluble part was 76% by weight. The toluene solution containing the soluble part was. bubbled with nitrogen, then de-watered, and disoxidated.

200 ml of dry toluene was put into a 0.5-liter stainless pressure autoclave equipped with a stirrer, along with a toluene solution of 1.45 mols/liter of methylaluminoxane (manufactured by Toso-Akuzo Co.) in an amount of 6 mmols in terms of aluminium atom, in a nitrogen stream, and then the toluene solution of 16 g of the copolymerized macromonomer was added to this, and kept stirred at 25° C. for 10 minutes.

Next, 0.5 ml of a toluene solution containing 2 μmols of rac-dimethylsilylene-bis(2-methyl-4-phenyl-indenyl) zirconium dichloride (rac-$Me_2Si[2$-Me-4-Ph-Ind$]_2ZrCl_2$) was added to this, and thereafter propylene was continuously added thereto at a gauge pressure of 1.0 $kg/cm^2G$ at 25° C. for 60 minutes to obtain a propylene-based copolymer.

After the reaction, the non-reacted propylene was removed through degassing and nitrogen purging, and thereafter the resulting reaction mixture was stirred while being exposed to air, whereby the catalyst was inactivated. 300 ml of toluene was further added to the toluene solution of the reaction mixture, and stirred at 30° C. for 2 hours. Then, this was filtered to recover the propylene-based copolymer. The same operation was repeated three times. The copolymer was dried in air and then further dried in vacuum at 80° C. Its yield was 58.7 g.

The data of the physical properties of the propylene-based copolymer are shown in Table 1 below.

The ethylene/propylene copolymerized macromonomer content of the copolymer was obtained according to the method mentioned below.

From the ratio of methyl carbon/methylene carbon as obtained through $^1$H-NMR, calculated were the ethylene/propylene copolymerized macromonomer prepared in (1)

and the ethylene/propylene composition in the propylene-based copolymer obtained in (2). From those, derived was the ethylene/propylene copolymerized macromonomer content of the propylene-based copolymer obtained in (2).

EXAMPLE 2

(1) Production of Ethylene/propylene Copolymerized Macromonomer

In the same manner as in Example 1-(1) except that the amount of bispentamethylcyclopentadienyl hafnium dichloride added was 5 µmols and that the polymerization time was 30 minutes, 103 g of a macromonomer was obtained. The part of the macromonomer soluble in toluene at room temperature was 67.7% by weight.

(2) Copolymerization of Propylene with Ethylene/propylene Copolymerized Macromonomer In the same manner as in Example 1-(2) except that 8 g of the toluene-soluble macromonomer prepared in (1) herein was used and that the polymerization time was 4 hours, obtained was 44.3 g of a propylene-based copolymer. This was evaluated in the same manner as in Example 1, and the test data are shown in Table 1.

EXAMPLE 3

In the same manner as in Example 2-(2) except that 0.25 mmols of triisobutyl aluminium was additionally used, that 2.5 mmols of methylaluminoxane and 0.2 µmols of rac-dimethylsilylene-bis(2-methyl-4-phenyl-indenyl)zirconium dichloride were used, that the polymerization temperature was 70° C., that the propylene pressure was 7.0 kg/cm²G, and that the polymerization time was 60 minutes, obtained was 82.3 g of a propylene-based copolymer. This was evaluated in the same manner as in Example 1, and the test data are shown in Table 1.

Comparative Example 1

The physical properties of a commercially-available propylene-based polymer "Idemitsu Polypro E-185G" (manufactured by Idemitsu Petro-chemical Co.) were measured. The data obtained are shown in Table 1.

TABLE 1

|  | Example 1 | Example 2 | Example 3 | Comparative Example 1 |
|---|---|---|---|---|
| Molecular weight |  |  |  |  |
| Mw | 203,000 | 309,000 | 203,000 | 406,000 |
| Mw/Mn | 2.2 | 2.0 | 2.5 | 6.3 |
| Limiting Viscosity [h] (dl/g) | 1.94 | 2.65 | 1.74 | 3.15 |
| Melt Tension MS (g) |  |  |  |  |
| Found | 4.3 | 14.3 | 5.1 | 5.4 |
| Calculated[1] | 1.71 | 4.59 | 1.21 | 7.94 |
| MI$_5$ (g/10 min) | 4.80 | 0.52 | 4.75 | 1.49 |
| MI$_{2.16}$ (g/10 min) | 0.87 | 0.02 | 0.93 | 0.38 |
| MI$_5$/MI$_{2.6}$ |  |  |  |  |
| Found | 5.52 | 26.00 | 5.15 | 3.92 |
| Calculated[2] | 3.63 | 3.58 | 4.34 | 4.61 |
| Melting Pint Tm (° C.) | 152 | 157 | 154 | 161 |
| Macromonomer Content (wt. %) | 4.5 | 3.5 | 4.0 | — |
| Ethylene Unit Content (wt. %) | 2.7 | 2.4 | 2.7 | — |

Notes)
[1] Calculated from log MS = 3.17 × log [h] − 0.68
[2] Calculated from MI$_5$/MI$_{2.6}$ ≧ 0.240 × Mw/Mn + 3.1

Comparative Example 2

Polypropylene ([h]=0.82 dl/g) and ethylene/propylene random copolymer (ethylene content=29% by weight, [h]=3.65 dl/g) were melted and kneaded in the ratio shown in Table 2 below, in a blast mill, at 200° C. and at 100 rpm for 5 minutes. The resulting melt mixture was press-shaped at 230° C. into a sheet having a thickness of 2 mm. The sheet was cut into test pieces, of which the properties were measured. Using a transmission microscope, the phase separation structure of the test piece was observed. The data obtained are shown in Table 2.

EXAMPLE 4

Polypropylene ([h]=0.82 dl/g), ethylene/propylene random copolymer (ethylene content=29% by weight, [h]=3.65 dl/g) and the propylene-based copolymer obtained in Example 3 were melted and kneaded in the ratio shown in Table 2 below, in a blast mill, at 200° C. and at 100 rpm for 5 minutes. From resulting melt mixture, prepared were test pieces in the same manner as in Comparative Example 2, of which the properties were measured. Using a transmission microscope, the phase separation structure of the test piece was observed. The data obtained are shown in Table 2.

As is obvious from Table 2, the mean grain size of the grains constituting the ethylene/propylene copolymer phase in the test pieces of Example 4 is smaller than that in the test pieces of Comparative Example 2, resulting that the miscibility of the polymers in Example 4 is better than that in Comparative Example 2. As a result, the Izod impact strength of the sample of Example 4 is higher than that of the sample of Comparative Example 2.

TABLE 2

|  | Comparative Example 2 | Example 4 |
|---|---|---|
| Amount of Polypropylene (wt. pts.) | 84 | 76 |
| Amount of Ethylene/Propylene Copolymer (wt. pts.) | 16 | 14 |
| Propylene-based Copolymer | — | Copolymer of Example 3 |
| Amount of Propylene-based Copolymer (wt. pts.) | 0 | 10 |
| Izod Impact Strength (notched, 23° C.) (kJ/m²) | 5.6 | 6.4 |
| Mean Grain Size of Grains in Ethylene/Propylene Copolymer Phase (µm) | 4.1 | 1.4 |

EXAMPLE 5

400 ml of dry toluene was put into a 1.6-liter stainless pressure autoclave equipped with a stirrer, along with methylaluminoxane (toluene solution manufactured by Toso-Akuzo Co.) in an amount of 5 mmols in terms of aluminium atom, in a nitrogen stream. The contents were stirred at 500 rpm for 5 minutes, while being heated up to 90° C.

To this was added 2 µmols of rac-dimethylsilylene-bis(2-methyl-4-phenyl-indenyl)zirconium dichloride (rac-Me$_2$Si[2-Me-4-Ph-Ind]$_2$ZrCl$_2$) in toluene, and thereafter propylene was continuously added thereto at a gauge pressure of 2.0 kg/cm²G, and polymerized at 90° C. for 30 minutes (first-stage reaction). Next, the polymerization temperature was lowered to 60° C., and propylene was continuously added to the reaction system at a gauge pressure of 7.0 kg/cm²G, and polymerized at 60° C. for 30 minutes (second-stage reaction).

After the reaction, the non-reacted propylene was removed through degassing, the catalyst was inactivated with a small amount of methanol, and thereafter the propylene homopolymer formed was recovered through filtration. This was dried in air and then further dried in vacuum. Its yield was 117 g. The data of the physical properties of the propylene homopolymer are shown in Table 3 below.

EXAMPLE 6

In the same manner as in Example 5 except that, in the first-stage reaction, the propylene pressure was 1.0 kg/cm²G, the polymerization temperature was 85° C. and the polymerization time was 45 minutes, and that, in the second-stage reaction, the propylene pressure was 3.0 kg/cm²G, the polymerization temperature was 55° C. and the polymerization time was 30 minutes, obtained was 84.0 g of a propylene homopolymer. The data of the physical properties of the homopolymer are shown in Table 3.

Comparative Example 3

The physical properties of a commercially-available propylene-based polymer "Idemitsu Polypro E-185G" (manufactured by Idemitsu Petro-chemical Co.) were measured. The data obtained are shown in Table 3.

TABLE 3

|  | Example 5 | Example 6 | Comparative Example 3 |
|---|---|---|---|
| Molecular Weight |  |  |  |
| Mw | 189,000 | 173,000 | 406,000 |
| Mw/Mn | 3.9 | 3.8 | 6.3 |
| Limiting Viscosity [h] (dl/g) | 1.75 | 1.62 | 3.15 |
| Melt Tension MS (g) |  |  |  |
| Found | 2.8 | 1.9 | 5.4 |
| Calculated[1] | 1.23 | 0.96 | 7.94 |
| Melt Index |  |  |  |
| MI$_5$ (g/10 min) | 9.84 | 54.9 | 1.49 |
| MI$_{2.16}$ (g/10 min) | 1.65 | 8.81 | 0.38 |
| MI$_5$/MI$_{2.16}$ |  |  |  |
| Found | 5.96 | 6.23 | 3.92 |
| Calculated[2] | 4.04 | 4.01 | 4.61 |
| Melting Point Tm (° C.) | 149 | 157 | 161 |

Notes)
[1] Calculated from log MS = 3.17 × log [h] − 0.68
[2] Calculated from MI$_5$/MI$_{2.6}$ = 0.240 × Mw/Mn + 3.1

The following Examples 7 to 9 are to demonstrate the second aspect of the invention, and the following Comparative Examples 4 and 5 are to be compared with the second aspect of the invention.

EXAMPLE 7

(1) Preparation of Methylaluminoxane-carrying Silica

Toluene was evaporated from a toluene solution of methylaluminoxane (1.45 mols/liter) (manufactured by XXX Co.), and this was then heated at 45° C. for 4 hours under reduced pressure. To this was added dry toluene until its volume became the same as that before the toluene evaporation, and stirred to be again a uniform solution. This was kept static for one full day, and its supernatant in which methylaluminoxane was completely dissolved in toluene was separated. This was used in the following process. 4.67 g of silica (CARIACT P-10, manufactured by Fuji Silicia Chemical Co.) that had been baked at 200° C. for 4 hours under reduced pressure was dispersed in 200 ml of dry toluene, and 30 ml of the toluene solution of methylaluminoxane that had been processed as above was dropwise added thereto with stirring at 0° C. over a period of 60 minutes. After the addition, this was stirred for further 60 minutes as such, then for 30 minutes at 20° C., and thereafter for 120 minutes at 80° C. Next, using 100 ml of dry toluene, the resulting mixture was decanted two times at 60° C. to wash the solid component. Further, this was washed once with 100 ml of dry toluene in the same manner. Dry hexane was added to this to make its total volume 230 ml. Thus was prepared methylaluminoxane-carrying silica.

(2) Production of Propylene/1-octene Copolymer

A stainless pressure autoclave equipped with a stirrer was dried and charged with nitrogen, to which were added 400 ml of dry heptane, 2 ml of 1-octene and 0.5 ml of a heptane solution of triisobutyl aluminium (in an amount of 0.5 mmols in terms of aluminium atom) in a nitrogen stream. These were stirred at 500 rpm and heated up to 80° C., to which was continuously introduced propylene at a pressure of 2.0 kg/cm²G.

Apart from this, 15 ml of a heptane slurry containing 0.8 mmols, in terms of aluminium atom, of the methylaluminoxane-carrying silica that had been prepared in (1), and 1.0 ml of a heptane solution of rac-dimethylsilylene-bis(2-methyl-4-phenyl-indenyl)zirconium dichloride (rac-Me$_2$Si[2-Me-4-Ph-Ind]$_2$ZrCl$_2$) (corresponding to 5 μmols) were stirred at room temperature for 10 minutes. The resulting catalyst mixture was put into the autoclave via a balance line connected with the autoclave, and the polymerization of the monomers was started. After the polymerization was effected for 60 minutes, the non-reacted propylene was removed through degassing. The copolymer formed was collected in the form of its heptane solution of being 15 ml. This is referred to as Copolymer I.

Next, propylene was further introduced into the autoclave at a gauge pressure of 7.5 kg/cm²G, and the polymerization was further continued for 2 hours at 70° C. After the polymerization, the non-reacted propylene was removed through degassing. The reaction mixture was put into a large amount of methanol, filtered, and dried to recover 61.5 g of a propylene/1-octene copolymer. This is referred to as Copolymer II.

(3) Evaluation of Propylene/1-octene Copolymer

Copolymer I was evaluated, and its data are shown in Table 4. Copolymer II was evaluated, and its data are shown in Table 5.

EXAMPLE 8

(1) Production of Propylene/ethylene Copolymer

A stainless pressure autoclave equipped with a stirrer was dried and charged with nitrogen, to which were added 400 ml of dry heptane and 0.5 ml of a heptane solution of triisobutyl aluminium (in an amount of 0.5 mmols in terms of aluminium atom) in a nitrogen stream. These were stirred at 500 rpm and heated up to 80° C., to which were continuously introduced ethylene at a flow rate of 0.15 liters/min and propylene at a flow rate of 2.9 liters/min, the total gauge pressure being 2.0 kg/cm²G.

Apart from this, 15 ml of a heptane slurry containing 0.8 mmols, in terms of aluminium atom, of the methylaluminoxane-carrying silica that had been prepared in Example 7, and 1.0 ml of a heptane solution of rac-dimethylsilylene-bis(2-methyl-4-phenyl-indenyl)zirconium dichloride (rac-Me$_2$Si[2-Me-4-Ph-Ind]$_2$ZrCl$_2$) (corresponding to 5 μmols) were stirred at room temperature for 10 minutes. The resulting catalyst mixture was put into the autoclave via a balance line connected with the autoclave, and the polymerization of the monomers was started. After the polymerization was effected for 60 minutes, the non-reacted ethylene and propylene were removed through degassing. The copolymer formed was collected in the form of its heptane solution of being 15 ml. This is referred to as Copolymer III.

Next, ethylene and propylene were further introduced into the autoclave at a flow rate of 0.15 liters/min and 3.06 liters/min, respectively, the total gauge pressure being 7.5 kg/cm$^2$G, and the polymerization was further continued for 2 hours at 55° C. After the polymerization, the non-reacted ethylene and propylene were removed through degassing. The reaction mixture was put into a large amount of methanol, filtered, and dried to recover 97 g of a propylene/ethylene copolymer. This is referred to as Copolymer IV.

(2) Evaluation of Propylene/ethylene Copolymer

Copolymer III was evaluated, and its data are shown in Table 4. Copolymer IV was evaluated, and its data are shown in Table 5.

EXAMPLE 9

(1) Production of Propylene/ethylene Copolymer

In the same manner as in Example 8, obtained was Copolymer III.

After this, hydrogen was introduced into the autoclave at 1.0 kg/cm$^2$G, and ethylene was continuously introduced thereinto at its partial pressure of 6.5 kg/cm$^2$G to further continue the polymerization at 60° C. for 1 hour. After the polymerization, the non-reacted ethylene was removed through degassing. Next, the reaction mixture was put into a large amount of methanol, filtered and dried to recover 164 g of propylene/ethylene copolymer. This is referred to as Copolymer V.

(2) Evaluation of Propylene/ethylene Copolymer

Copolymer V was evaluated, and its data are shown in Table 5.

Comparative Example 4

(1) Preparation of Solid Catalyst Component

A 500-ml reactor equipped with a stirrer was fully purged with nitrogen gas, to which were added 30 g of magnesium diethoxide, 150 ml of pure heptane, 4.5 ml of silicon tetrachloride, and 5.4 ml of di-n-butyl phthalate, and stirred. While the system was kept at 90° C., 144 ml of titanium tetrachloride was added thereto, and stirred for further 2 hours at 110° C. After this, the solid component was separated from the system, and washed with pure heptane at 80° C. To this was added 228 ml of titanium tetrachloride, and stirred at 110° C. for 2 hours. Then, the solid component was separated, and fully washed with pure heptane at 80° C. Thus was obtained a solid catalyst component.

(2) Pre-treatment

A 500-ml reactor equipped with a stirrer was fully purged with nitrogen gas, to which were added 230 ml of pure heptane, 25 g of the solid catalyst component that had been prepared in (1), 1.0 mol/mol, relative to the titanium atom in the solid catalyst component, of triethylaluminium, and 1.8 mols/mol, relative to the same, of dicyclopentyldimethoxysilane. Next, propylene was introduced into the reactor to make it have a partial pressure of 0.3 kg/cm$^2$G, and polymerized at 25° C. for 4 hours. After the polymerization, the solid catalyst component was washed for a total of a few times with pure heptane, and carbon dioxide was applied thereto and stirred for 24 hours.

(3) Production of Propylene/1-octene Copolymer

A stainless pressure autoclave equipped with a stirrer was dried and charged with nitrogen, to which were added 400 ml of dry heptane, 10 ml of 1-octene and 2.0 ml of a heptane solution of triethyl aluminium (in an amount of 2.0 mmols in terms of aluminium atom) in a nitrogen stream. These were stirred at 500 rpm and heated up to 70° C.

Next, 5 μmols, in terms of titanium atom, of the catalyst that had been prepared in (2) was put into the autoclave, and hydrogen was introduced thereinto to have a gauge pressure of 0.5 kg/cm$^2$G. Further, propylene was continuously introduced thereinto at a gauge pressure of 7.0 kg/cm$^2$G, and the polymerization was effected for 6 hours. After the polymerization, the non-reacted propylene was removed through degassing. Then, the reaction mixture was put into a large amount of methanol, filtered and dried to recover 83.5 g of a propylene/1-octene copolymer.

The data of the physical properties of the copolymer are shown in Table 5.

Comparative Example 5

Production of Propylene/ethylene Copolymer

A stainless pressure autoclave equipped with a stirrer was dried and charged with nitrogen, to which were added 400 ml of dry heptane, 0.25 mmols of dicyclopentyldimethoxysilane and 2.0 ml of a heptane solution of triethyl aluminium (in an amount of 2.0 mmols in terms of aluminium atom) in a nitrogen stream. These were stirred at 500 rpm and heated up to 70° C. Then, ethylene was introduced thereinto at a flow rate of 0.8 liters/min, propylene was thereinto at a flow rate of 2.9 liters/min, and hydrogen was thereinto at a flow rate of 0.2 liters/min, the total gauge pressure being 7.0 kg/cm$^2$G.

Next, 5 μmols, in terms of titanium atom, of the catalyst that had been prepared in Comparative Example 4 was put into the autoclave, and the polymerization of the monomers was started. After the polymerization was effected for 6 hours, the non-reacted ethylene and propylene were removed through degassing. Then, the reaction mixture was put into a large amount of methanol, filtered and dried to recover 70.5 g of a propylene/ethylene copolymer.

The data of the physical properties of the copolymer are shown in Table 5.

TABLE 4

| | Propylene Content (mol %) | Number-average Molecular Weight Mw | [mm] (%) | Terminal Vinyl Group |
|---|---|---|---|---|
| Copolymer I in Example 7 | 99.9 | 97,000 | 95.4 | Yes, this had. |
| Copolymer III in Examples 8 and 9 | 96.3 | 122,000 | 98.2 | Yes, this had. |

TABLE 5

| | Propylene Content (mol %) | Melt Index MI (g/10 min) | Melt Tension MS (g) | Log MS | −0.907 × log MI + 0.375 |
|---|---|---|---|---|---|
| Copolymer II in Example 7 | 99.8 | 6.6 | 1.4 | 0.82 | −0.37 |
| Comparative Example 4 | 99.2 | 6.8 | 0.2 | −0.70 | −0.38 |
| Copolymer IV in Example 8 | 98.5 | 16.1 | 1.5 | −0.30 | −0.72 |
| Comparative Example 5 | 98.0 | 15.1 | <0.1 | <−1.0 | −0.69 |
| Copolymer V in Example 9 | 9.3 | 0.8 | — | — | — |

The following Examples 10 and 11 are to demonstrate the third aspect of the invention, and the following Comparative Example 6 is to be compared with the third aspect of the invention.

EXAMPLE 10

(1) Production of Ethylene/propylene Copolymerized Macromonomer 600 ml of dry toluene was put into a 1.6-liter stainless pressure autoclave equipped with a stirrer, along with a toluene solution of 1.45 mols/liter of methylaluminoxane (manufactured by Toso-Akuzo Co.) in an amount of 6 mmols in terms of aluminium atom, in a nitrogen stream. The contents were stirred at 500 rpm at a controlled temperature of 20° C., to which was added propylene until saturation at a gauge pressure of 7.0 kg/cm²G. Next, ethylene was added thereto until saturation at a partial pressure of 2.0 kg/cm². Next, 20 ml of a toluene solution containing 20 μmols of bispentamethylcyclopentadienyl hafnium dichloride ($Cp*_2HfCl_2$) was introduced into the autoclave through a balance line connected with the autoclave, and the monomers were copolymerized at 20° C. In this stage, ethylene was. continuously introduced into the system for 10 minutes whereby the total pressure was kept constant.

After the reaction, the non-reacted monomers were expelled from the autoclave through degassing, and then completely removed therefrom through nitrogen purging, and thereafter the catalyst was inactivated with a small amount of methanol.

The reaction mixture containing ethylene/propylene copolymerized macromonomer was recovered, and deashed with diluted HCl/methanol/water. Then, this was washed five times with ion-exchanged water, dried with anhydrous magnesium sulfate, and evaporated to dryness to recover the ethylene/propylene copolymerized macromonomer. Its yield was 59.5 g.

(2) Copolymerization of Ethylene/propylene with Ethylene/propylene Copolymerized Macromonomer The macromonomer obtained in (1) was dissolved in toluene, from which was fractionated the part soluble in toluene at room temperature. The amount of the soluble part was 76% by weight. The toluene solution containing the soluble part was bubbled with nitrogen, then de-watered, and disoxidated.

A 0.5-liter stainless pressure autoclave equipped with a stirrer was dried and charged with nitrogen, to which were added 400 ml of dry heptane, a toluene solution of 3.1 g of the copolymerized macromonomer prepared in the above, and 0.5 ml of a heptane solution of triisobutyl aluminium (0.5 mmols in terms of aluminium atom). These were stirred at 500 rpm and heated up to 70° C.

Next, 15 ml of a heptane slurry containing 0.8 mmols, in terms of aluminium atom, of methylaluminoxane as carried by silica ($SiO_2$), and 1.0 ml of a heptane solution of rac-dimethylsilylene-bis(2-methyl-4-phenyl-indenyl) zirconium dichloride (rac-$Me_2Si[2-Me-4-Ph-Ind]_2ZrCl_2$) (corresponding to 5 μmols) were stirred at room temperature for 10 minutes. The resulting catalyst mixture was put into the autoclave.

Next, ethylene and propylene were continuously introduced into the autoclave at a flow rate of 0.15 liters/min and 3.06 liters/min, respectively, the total gauge pressure being 7 kg/cm²G, and the monomers were polymerized for 2 hours. After the polymerization, the non-reacted monomers were removed through degassing, and 1 ml of ethyl alcohol was added to the reaction mixture to inactivate the catalyst. Further, 300 ml of heptane was added thereto, and stirred at 30° C. for 2 hours, and thereafter the copolymer formed was recovered. This operation was repeated three times. After having been dried in air and further dried under reduced pressure, obtained was the copolymer of being 47 g. The data of the physical properties of this copolymer are shown in Table 6.

The ethylene/propylene copolymerized macromonomer content of the copolymer was obtained according to the method mentioned below.

From the ratio of methyl carbon/methylene carbon as obtained through $^1$H-NMR, calculated were the ethylene/propylene copolymerized macromonomer prepared in (1) and the ethylene/propylene composition in the copolymer obtained in (2). From those, derived was the ethylene/propylene copolymerized macromonomer content of the propylene-based copolymer obtained in (2). The ethylene content of the macromonomer was obtained from the ethylene/propylene composition ratio of the ethylene/propylene copolymerized macromonomer. The data thus obtained are shown in Table 6.

TABLE 6

|  |  | Example 10 |
|---|---|---|
| Molecular Weight | Mw | 38800 |
|  | Mw/Mn | 2.6 |
| Limiting Viscosity [h] (dl/g) |  | 2.19 |
| Melt Tension MS (g) | Found | 5.7 |
|  | Calculated[1] | 3.3 |
| MI$_5$ (g/10 min) |  | 3.1 |
| MI$_{2.16}$ (g/10 min) |  | 0.69 |
| MI$_5$/MI$_{2.16}$ | Found | 4.49 |
|  | Calculated[2] | 3.76 |
| Melting Point Tm (° C.) |  | 149 |
| Macromonomer Content (wt. %) |  | 1.8 |
| Ethylene Content (mol %) |  | 97.5 |

Notes)
[1] Calculated from log MS = −0.907 × log [MI] + 0.375
[2] Calculated from MI$_5$/MI$_{2.6}$ = 0.240 × Mw/Mn + 3.10

Comparative Example 6

Polypropylene ([h]=0.82 dl/g) and ethylene/propylene random copolymer (ethylene content=29% by weight, [h]=3.65 dl/g) were melted and kneaded in the ratio shown in Table 7 below, in a blast mill, at 200° C. and at 100 rpm for 5 minutes. The resulting melt mixture was press-shaped at 230° C. into a sheet having a thickness of 2 mm. The sheet was cut into test pieces, of which the properties were measured. Using a transmission microscope, the phase separation structure of the test piece was observed. The data obtained are shown in Table 7.

EXAMPLE 11

Polypropylene ([h]=0.82 dl/g), ethylene/propylene random copolymer (ethylene content=29% by weight, [h]=3.65 dl/g) and the copolymer obtained in Example 10 were melted and kneaded in the ratio shown in Table 7, in a blast mill, at 200° C. and at 100 rpm for 5 minutes. From resulting melt mixture, prepared were test pieces in the same manner as in Comparative Example 6, of which the properties were measured. Using a transmission microscope, the phase separation structure of the test piece was observed. The data obtained are shown in Table 7.

As is obvious from Table 7, the mean grain size of the grains constituting the ethylene/propylene copolymer phase in the test pieces of Example 11 is smaller than that in the test pieces of Comparative Example 6, resulting that the miscibility of the polymers in Example 11 is better than that in Comparative Example 6. As a result, the Izod impact strength of the sample of Example 11 is higher than that of the sample of Comparative Example 6.

TABLE 7

|  | Comparative Example 6 | Example 11 |
|---|---|---|
| Amount of Polypropylene (wt.pts.) | 84 | 76 |
| Amount of Ethylene/Propylene Copolymer (wt.pts.) | 16 | 14 |
| Propylene-based Copolymer | — | Copolymer of Example 10 |
| Amount of Propylene-based Copolymer (wt.pts.) | 0 | 10 |
| Izod Impact Strength (notched, 23° C.) (kJ/m²) | 5.6 | 7.0 |
| Mean Grain Size of Grains in Ethylene/Propylene Copolymer Phase (μm) | 4.1 | 1.2 |

As having been mentioned in detail hereinabove, the propylene-based polymers of the invention are characterized in that their physical properties are comparable to or better than the physical properties of conventional propylene-based polymers, that they have high melt tension, high melt visco-elasticity and high melt fluidity, that their melt tension is well controllable, and that they are suitable to foaming, sheet-making and blow molding. In addition, as having good melt workability, the propylene-based polymers of the invention are well workable in various molding methods of, for example, large-size blow molding and extrusion foaming, to which conventional propylene-based polymers could not apply.

In addition, the propylene-based polymers of the invention are favorably used as miscibility improvers for propylene homopolymers and propylene-based random and/or block copolymers.

While the invention has been described in detail and with reference to specific embodiments thereof, it will be apparent to one skilled in the art that various changes and modifications can be made therein without departing from the spirit and scope thereof.

What is claimed is:

1. A long chain, branched propylene homopolymer that is produced only from propylene monomer, wherein
   (a) 1) a ratio of $MI_5/MI_{2.16}$, $MI_5$ being a melt index of the polymer in g/10 min as measured at 230° C. under a load of 5.0 kg, and $MI_{2.16}$ being a melt index of the polymer in g/10 min as measured at 230° C. under a load of 2.16 kg, and 2) a ratio of Mw/Mn, Mw being a weight-average molecular weight of the polymer and Mn being a number-average molecular weight of the polymer both measured by gel permeation chromatography, satisfy the following requirement:

$$MI_5/MI_{2.16} \geq 0.240 \times Mw/Mn + 3.1 \quad \text{(I)};$$

and
   (b) a melt tension, MS(g), of the polymer as measured at 230° C. and a limiting viscosity (η) of the polymer as measured in tetracycline at 135° C. satisfy the following requirement:

$$\log MS \geq 3.17 \times \log(\eta) - 0.68 \quad \text{(II)};$$

wherein the ratio of Mw/Mn is 1.5 to 4.5 and the limiting viscosity (η) is 0.1 to 15.0 dl/g.

2. The long chain, branched propylene homopolymer according to claim 1, which has a melting point of 120 to 165° C. as measured by differential scanning calorimetry.

3. The long chain, branched propylene polymer according to claim 1, wherein said limiting viscosity is 0.4 to 10.0 dl/g.

4. The long chain, branched propylene polymer according to claim 1, wherein said limiting viscosity is 0.6 to 6.0 dl/g.

5. The long chain, branched propylene polymer according to claim 1, wherein a diethyl ether soluble content of the polymer is not larger than 2% by weight.

6. The long chain, branched propylene polymer according to claim 1, wherein a diethyl ether soluble content of the polymer is not larger than 1% by weight.

7. A long chain, branched propylene-based copolymer, wherein
   (a) 1) a ratio of $MI_5/MI_{2.16}$, $MI_5$ being a melt index of the polymer in g/10 min as measured at 230° C. under a load of 5.0 kg, and $MI_{2.16}$ being a melt index of the polymer in g/10 min as measured at 230° C. under a load of 2.16 kg, and 2) a ratio of Mw/Mn, Mw being a weight-average molecular weight of the polymer and Mn being a number-average molecular weight of the polymer both measured by gel permeation chromatography, satisfy the following requirement:

$$MI_5/MI_{2.16} \geq 0.240 \times Mw/Mn + 3.1 \quad \text{(I)};$$

and
   (b) a melt tension, MS(g), of the polymer as measured at 230° C. and a limiting viscosity (η) in dl/g of the polymer as measured in tetracycline at 135° C. satisfy the following requirement $$\log MS \geq 3.17 \times \log(\eta) - 0.68 \quad \text{(II)};$$

wherein the ratio of Mw/Mn is 1.5 to 4.0 and the limiting viscosity (η) is 0.1 to 15.0 dl/g;
   wherein said long chain, branched propylene-based copolymer has a graft chain consisting essentially of a copolymer moiety of propylene with ethylene and/or an α-olefin having 4 or more carbon atoms.

8. The long chain, branched propylene-based copolymer according to claim 7, wherein a content of the copolymer moiety is 3% by weight or more.

9. A miscibility improver for propylene homopolymers and propylene-based block and/or random copolymers, comprising the long chain, branched propylene-based copolymer according to claim 7.

10. The long chain, branched propylene polymer according to claim 7, wherein said limiting viscosity is 0.4 to 10.0 dl/g.

11. The long chain, branched propylene polymer according to claim 7, wherein said limiting viscosity is 0.6 to 6.0 dl/g.

12. The long chain, branched propylene polymer according to claim 7, wherein a diethyl ether soluble content of the polymer is not larger than 2% by weight.

13. The long chain, branched propylene polymer according to claim 7, wherein a diethyl ether soluble content of the polymer is not larger than 1% by weight.

14. The long chain, branched propylene-based copolymer according to claim 7, wherein said α-olefin is selected from the group consisting of butene-1, pentene-1,4-methyl-pentene-1, hexene-1, octene-1, decene-1, dodecene-1, tetradecene-1, hexadecene-1, octadecene-1, eicosene-1 and a mixture thereof.

15. The long chain, branched propylene homopolymer according to claim 1, produced by a process comprising:
   reacting propylene in the presence of an olefin polymerization catalyst, thereby obtaining a reactive macromer;
   polymerizing said reactive macromer with propylene in the presence of an olefin polymerization catalyst.

16. The long chain, branched propylene-based copolymer according to claim 7, produced by a process comprising:

reacting propylene and ethylene and/or an α-olefin having 4 or more carbon atoms in the presence of an olefin polymerization catalyst, thereby obtaining a reactive macromer;

polymerizing said reactive macromer with propylene in the presence of an olefin polymerization catalyst.

17. The long chain, branched propylene homopolymer according to claim 1, which has a melting point of 130 to 165° C. as measured by differential scanning calorimetry.

* * * * *